United States Patent [19]

Cherouse et al.

[11] Patent Number: 4,950,508
[45] Date of Patent: Aug. 21, 1990

[54] ARTICLE, COMPRISING RIGID PLANAR PARTS ASSEMBLED AT AN ANGLE

[76] Inventors: Thierry Cherouse, 688, rue des Communaux, Grignon, France, 73200; Christophe Riviere, La Piderie - Saint Herblon, Ancenis, France, 44150

[21] Appl. No.: 882,911
[22] PCT Filed: Oct. 21, 1985
[86] PCT No.: PCT/FR85/00298
§ 371 Date: Aug. 19, 1986
§ 102(e) Date: Aug. 19, 1986
[87] PCT Pub. No.: WO86/02415
PCT Pub. Date: Apr. 24, 1986

[30] Foreign Application Priority Data

Oct. 19, 1984 [FR] France .................. 84/16014

[51] Int. Cl.$^5$ ................ E04B 2/74; F16B 12/10; F16B 12/20
[52] U.S. Cl. ..................... 428/12; 52/665; 52/668; 403/345; 428/139
[58] Field of Search ........... 297/442; 403/345, 347, 403/346; 428/192, 139, 12, 137; 52/665, 668

[56] References Cited

U.S. PATENT DOCUMENTS

| 262,448 | 8/1882 | Maunder | 403/347 |
| 1,529,759 | 3/1925 | Widder | 403/169 |
| 2,680,501 | 6/1954 | Cunningham | 428/116 X |
| 2,844,910 | 7/1958 | Korchak | 446/85 X |
| 2,942,318 | 6/1960 | Charles | 428/11 X |
| 3,066,436 | 12/1962 | Schuh | 446/115 |
| 3,498,655 | 3/1970 | Arms et al. | 52/285 |
| 3,513,534 | 5/1970 | Bradley et al. | 29/525 X |
| 3,663,717 | 5/1972 | Coster | 428/542.2 X |
| 3,836,217 | 9/1974 | Shiina | 403/231 X |
| 3,901,612 | 8/1975 | Canin | 403/231 X |
| 4,119,283 | 10/1978 | De Yarmin | 403/347 X |
| 4,124,958 | 11/1978 | Chiche | 446/114 X |
| 4,345,635 | 8/1982 | Solomon | 160/133 |
| 4,700,915 | 10/1987 | Killian | D6/495 |

FOREIGN PATENT DOCUMENTS

WO84/00024 1/1984 World Int. Prop. O. ........... 428/12

Primary Examiner—Henry F. Epstein
Attorney, Agent, or Firm—Fleit, Jacobson, Cohn, Price, Holman & Stern

[57] ABSTRACT

First and second panel members each formed with an elongate slot extending from one edge of the panel member and an enlarged opening into which the slot extends are connected together at an angle by sliding the slot of one of the panel members lengthwise through the slot and opening of the other panel member and into embracing engagement with material of the other panel member beyond the opening therein until the openings of the respective panels are mutually aligned in the lengthwise direction of the slots. A locking key device having substantial rigidity lengthwise of the slots is fitted in the openings when the panels are assembled to prevent their separation. The locking device may be provided in various decorative forms.

13 Claims, 3 Drawing Sheets

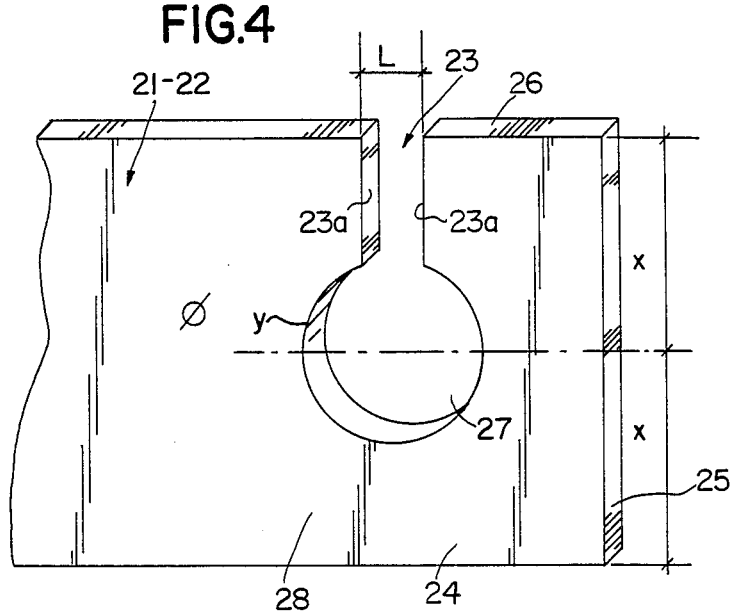
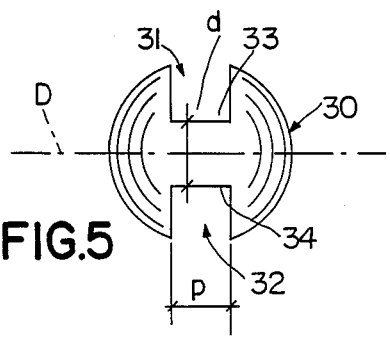
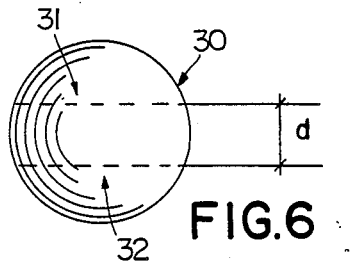
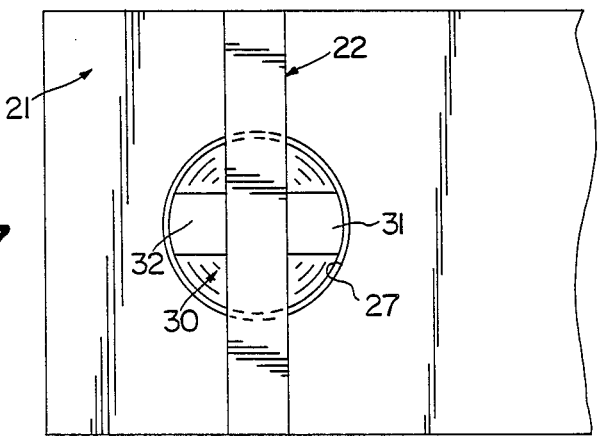

ARTICLE, COMPRISING RIGID PLANAR PARTS ASSEMBLED AT AN ANGLE

BACKGROUND OF THE INVENTION

The present invention relates to articles such as items of furniture, packaging elements, lightweight partitions, and the like, comprised of planar parts assembled perpendicularly (or substantially perpendicularly, with the angles between them being unequal supplementary angles).

It has long been known to assemble two pieces each one of which has a slot of length one half that of the piece, whereby after the two slots are mutually engaged the pieces are fitted together from interlocking with their end faces being coplanar.

This trivial assembly is known as a rebated joint (in French, a "half timber joint"). When assembled, each slot is directed toward the solid member of the opposing piece, and the bottoms of the slots are essentially disposed against each other. Refinements of this basic arrangement are also known—in particular, arrangement of the assembled pieces at an angle other than a right angle.

There is also known (PCT OS No. WO-A-84/00024) an assembly which includes locking means for the pieces after they are engaged, such means being namely a rigid "key". The pieces themselves must be flexible so as to be able to elastically deform to enable the rigid key to be forcibly introduced.

Fr. Pat. No. 2,049,386 describes a construction assembly comprised of members having slots of complex shapes, enabling a "rebated joint" assembly with two different orientations, perpendicular or oblique. The slots in these members have openings in them which are disposed in planes parallel to the plane of the corresponding slot. These openings are intended to receive locking pins which are inserted by sliding. These pins must necessarily have a thickness less than that of the aforesaid assembled members, because the pins run parallel to the surface planes of the respective members.

U.S. Pat. No. 1,529,759 describes a structure comprised of crossbeams and of uprights assembled by means very similar to those described in Fr. Pt. No. 2,049,386 discussed supra except that only orthogonal assembly is provided for. What is important to note is that the slots of the classical "rebated joint" assembly according to the U.S. Pat. are associated with openings each of which accommodates a locking rod which must extend in a plane parallel to the surface planes of the respective assembled pieces.

The present invention is entirely different from these concepts, and notably it employs locking keys which may be esthetic as well as utilitarian, which keys are visible in the assembled condition.

SUMMARY OF THE INVENTION

The invention relates to an article such as an item of furniture, which when unassembled comprises at least two pieces having rectilinear slots which engage one another (by mutual insertion) to achieve an orthogonal assembly of the said pieces; characterized in that the said pieces are in the form of panels which are relatively thin with respect the length and width of their two major faces, which panels have openings passing through them from one major face to the other, wherewith the said slots open out into said openings from one side of the latter, whereby after the engagement (mutual insertion) the slots are disposed beyond the openings which they have passed over lit., "they traverse", and each slot is disposed at right angles with and across a solid part of the other piece which solid part is disposed opposite to the slot on the said other piece, i.e. across the respective opening from said slot, and wherewith after said engagement the openings in the two panels are aligned and adapted to receive a locking key having the same height as the openings, which key is to extend in said openings and be supported on the two opposing sides of said openings which sides do not have slots in them, and which key is relatively rigid in its height dimension so as to prevent the slots from being moved back through the said openings, which movement would result in the disengagement of the slots and the separation of the pieces.

According to other characteristics i.e., refinements of the invention:

Each panel may be attached to a plate disposed in the opening, which plate has the same height as the opening and is pivotally mounted on a pivot with an axis parallel to that of the slot, which pivot is disposed outside of said opening, wherewith the said plate itself has a slot which is aligned with the slot of the panel and which extends to the center of the said plate (which is also the center of the said opening);

The locking key may be comprised of an elastically deformable material;

The locking key may be comprised of a central, rigid core which is surrounded by an elastically deformable material such as a synthetic foam material;

The shape of the locking key may be such that the key is rigid in its height dimension and is elastically deformable in directions (planes) perpendicular to the height dimension;

The locking key may be a tubular element comprised of a semi-flexible material, and intended to be placed in the openings with its virtual axis parallel to that of the slots;

The tubular element may have grooves extended to cooperate with the side faces of the slots;

Each opening in the panels may be circular, and the locking key may be in the form of a spherical element which is substantially rigid and which has two rectilinear grooves which are parallel and are symmetrical with respect to a diameter of the spherical element, wherewith the bottoms of the grooves are separated by a distance which is generally equal to the width of one of the slots.

The invention will be better understood with the aid of the following detailed description presented with reference to the attached drawings. The description and drawings are offered only by way of example, and do not limit the scope of the invention.

BRIEF DESCRIPTION OF DRAWINGS

FIG. 4 is a schematic elevation of an inventive piece, according to a second embodiment;

FIGS. 5 and 6 are schematic elevations of a locking key adapted for assembling two pieces of the type shown in FIG. 4;

FIG. 7 is a schematic elevation showing an assembly accomplished with two pieces of the type of that of FIG. 3 and with a locking key of the type of FIGS. 4 and 5;

DESCRIPTION OF PREFERRED EMBODIMENTS

Figure 1:
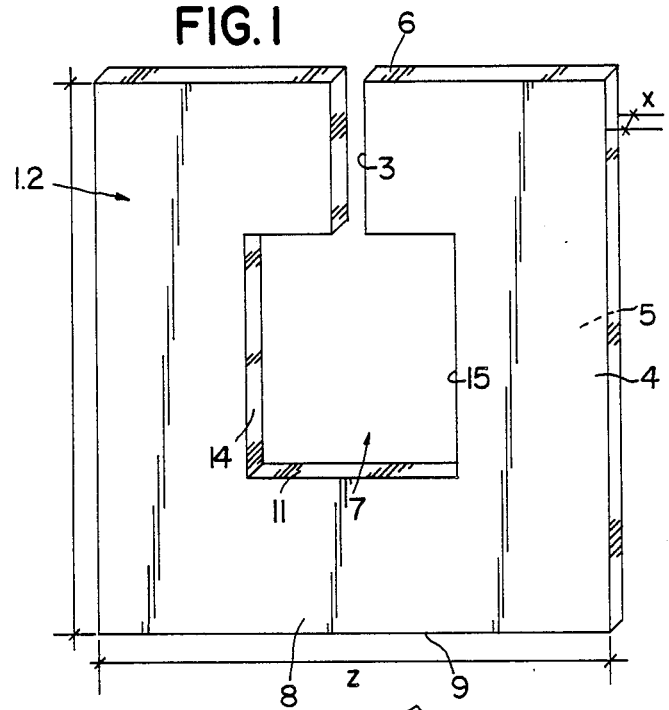
FIG. 1 is a schematic elevation of an inventive piece, e.g. for furniture, according to a first embodiment.
Figure 2:
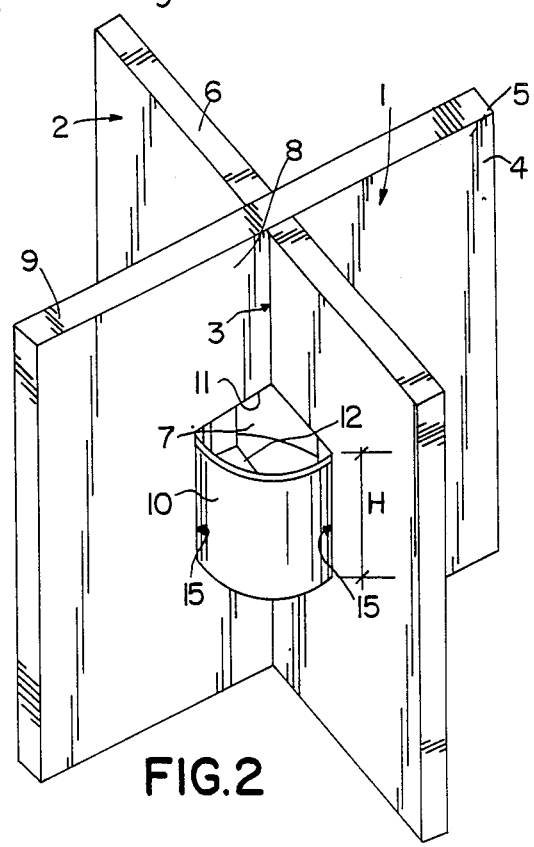
FIG. 2 is a schematic perspective view of an inventive assembly of two pieces of the type shown in FIG. 1.

The embodiment illustrated in FIGS. 1 and 2 is an article (such as an item of furniture), or a packaging element, or a partition or the like, which is assembled by interpenetration of at least two pieces (1,2) of the type shown in FIG. 1, which are panels or the like having thickness x which is small in relation to the length y and width z of the major faces of the piece.

Each piece 1-2 has a rectilinear slot 3 which is perpendicular to the planes of the major faces 4 and 5, which slot extends from an edge 6 and opens out in an opening 7 which passes through the piece from one major face 4 to the other major face 5. The opening 7 has a rectangular shape. The two pieces 1 and 2 are assembled by mutually inserting the slots 3 of the two pieces (1,2) into each other, whereby each of said slots passes through the respective other piece's opening 7 and becomes positioned beyond said opening so as to engage the solid parts 8 adjacent to the edge 9 which edge is opposite to the slotted edge 6 which defines the outer end of slot 3.

The openings 7 of the pieces 1 and 2 are aligned at this stage. In order to immobilize them, a locking key is placed in the two openings 7. This key should be rigid with respect to the direction parallel to the axis of the slots 3.

It can be seen from FIG. 2 that such a key may be comprised of a tubular element 10 comprised of an elastically deformable material. Such a tubular element 10 is substantially rigid with respect to its height dimension H parallel to the longitudinal dimension of the slots 3, but is elastically deformable perpendicularly to said dimension. In this way it is possible to insert element 10 laterally into the two aligned openings 7 by necessarily deforming said element 10, since the pieces 1 and 2 are rigid. The key being rigid in its height dimension H, it can be supported against the two opposing nonslotted edges 11 and 12 of the openings 7, with greater or lesser play (depending on the difference between the height H of the key 10 and the distance between the edges 11 and 12 when pieces 1 and 2 are assembled). Thus, key 10 acts in the manner of a wedge or crosspiece to oppose the disengagement of the engaged slots 3 and thereby to prevent the separation of the pieces 1 and 2.

It is noted that the openings 7 are aligned according to the invention, that the slots 3 are disposed at an angle to each other, and that the key 10 is visible over its entire periphery except across the thickness of the pieces 1 and 2. Thus, this key 10 can be made to play a visual role beyond its functional role, whereby it adds esthetically to the appearance of the assembly. In this connection, pieces 1 and 2 may be provided in a certain material and/or color, with the key 10 being of a material and/or color which contrasts with these visually.

The key 10 of the type just described is cylindrical, and can thus be rotated. If, on the other hand, it is desired for the key to be non-rotatable, it may be provided with grooves 13 (Fig. 3) which cooperate with the edges 14 and 15 of the openings 7, which edges are parallel to the slots 3.

It is noted that the grooves 13 also provide substantial holding of pieces 1 and 2 by way of the sides of said grooves, to ensure good perpendicular alignment of said pieces; and said grooves thereby contribute to the rigidity of the assembly.

Figure 3:
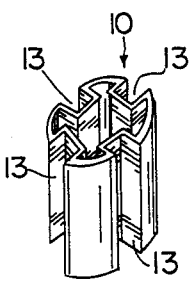
FIG. 3 is a schematic perspective view of a locking key which is a variant of that shown in FIG. 2.

Since the key 10 of FIG. 3 is tubular and flexible, it is installed in the manner described in connection with FIGS. 1 and 2, namely by deforming it and inserting it laterally into the aligned openings 7.

FIGS. 4 to 7 illustrate an embodiment according to which the pieces 21 and 22 are of the same general type as that illustrated in FIGS. 1 and 2, namely the pieces comprise relatively thin panels having a slot 23 perpendicular to the plane of the major faces 24 and 25. The slots 23 extend from an edge 26 to a circular opening 27.

The pieces are assembled by mutually inserting the slots 23 until each slot is disposed beyond the opening 27 of the other piece, and is disposed spanning the solid part 28 opposite the slot 23.

The assembled pieces 21 and 22 are immobilized by means of a key 30 comprised of a spherical element having two parallel grooves 31 and 32 which are parallel to and symmetrical with respect to a diameter D of the sphere. The bottoms 33 and 34 of grooves 31 and 32 are separated by a distance d which is generally equal to the width L of the slots 23. The width 1 of the grooves 31 and 32 is (except for slight play) equal to the thickness x of the pieces 21 and 22.

For the immobilization of the pieces 21 and 22 after assembly, the key 30 is placed in the opening of one of the pieces, with the grooves 31 and 32 being in a plane perpendicular to that of the large faces 24 and 25. The slot 23 of the second said piece is then engaged with the first said piece, and the second said piece is caused to slide such that the side faces 23a of its slot pass into the grooves 31 and 32 of the key 30. The opening 27 of the second said piece is at that stage disposed across the key 30. The key is then turned so that the grooves 31 and 32 extend perpendicularly to the planes of the two pieces 21 and 22. Thereby one obtains a locking effect, by bracing or wedging means, of the opposed openings 27 of the two engaged pieces 21 and 22.

Figure 8:
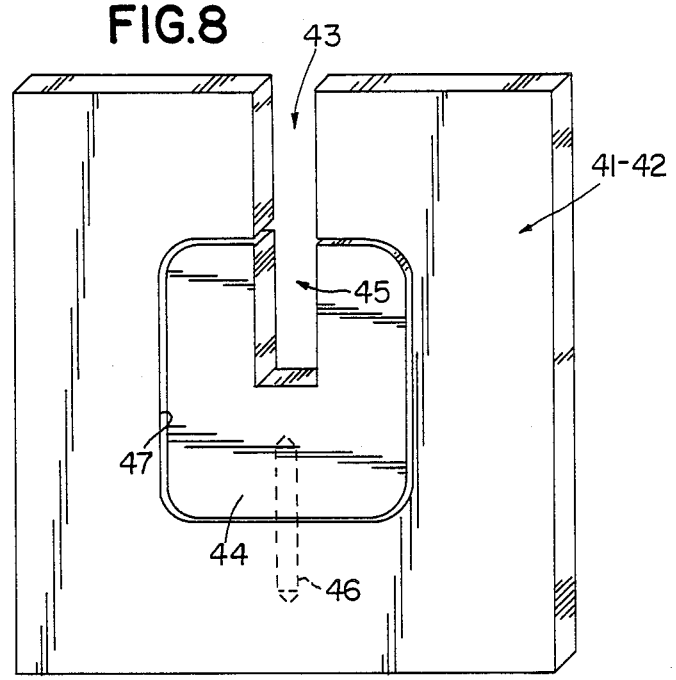
FIG. 8 is a schematic elevation of an inventive piece according to a third embodiment.
Figure 9:
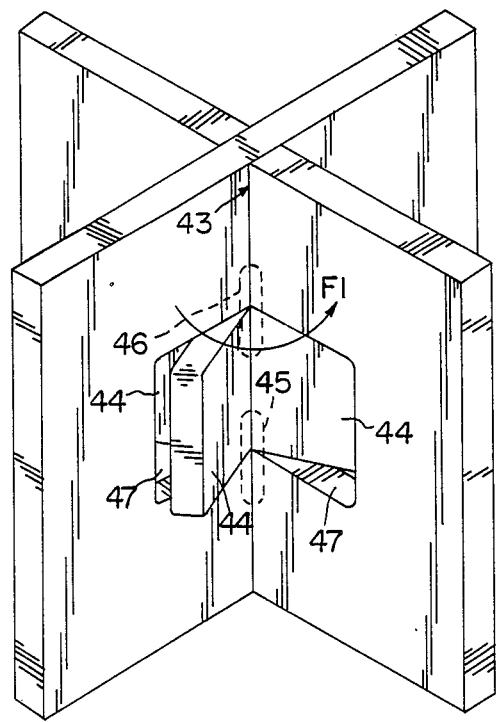
FIG. 9 is a schematic perspective view of an assembly of two pieces of the type shown in FIG. 8.

FIGS. 8 and 9 illustrate a third embodiment, according to which the pieces 41 and 42 are of the same type as that of FIGS. 1 and 2, and have a rectangular opening 47. The essential difference is that the locking key is not separate and independent as described supra, but results from the cooperation of two plates which are pivotably attached to the respective pieces, as will be described infra.

Opening 47 contains a solid plate 44 having a slot 45 and mounted on a pivot 46 mounted in the interior of the piece. It is seen that this mounting enables plate 44 to be pivoted around the pivot 46, with respect to the piece 41 or 42.

In the assembly process, care is taken to place the plate 44 or each piece 41, 42 in the plane of the piece, whereby the slot 45 constitutes a continuation of the slot 43. The slots 43 of the two pieces are inserted one in the other, and the sliding engagement of the said pieces is continued in the slots 45, which also are inserted one in the other, with the openings 47 being eventually aligned vertically. The plates 44 are thus joined together whereby they both pivot around the same axis, since the pivots 46 of the two plates 44 are coaxial. They are then pivoted together, as shown in FIG. 9, arrow F1. This pivoting is carried out through 90 degrees, namely until the plates 44 are again in the planes of the respective pieces (41, 42), with each plate 44 being in the plane of the opposite piece (41, 42), namely the plate 44 attached to piece 41 being in the plane of piece 42, and the plate 44 attached to piece 42 being in the plane of piece 41. In this way retraction and separation of the pieces is rendered impossible. In order to effect retraction of the pieces 41 and 42, the plates 44 must be pivoted by 90 degrees again (clockwise or counterwise), until the plate 44 attached to piece 41 is in the plane of piece 41, and the plate 44 attached to piece 42 is in the plane of piece 42. The slots 45 and 43 of a given piece-and-plate structure are thus again aligned, and the pieces can be slid apart, one with respect to the other.

It is seen in the above description that the key is in the form of a brace or wedge member, and that said key must be substantially rigid in its active direction parallel to the axis of the slots of the pieces. In the transverse plane, the key should be flexible and elastically deformable, if its contour is wider than that of the openings as aligned. Thus, the key may be in the form of a simple blocking rod, which is narrower, than the openings as aligned. But, if one is to take advantage of the presence of the key to provide a decorative element, the rigid key may be invested with a flexible material such as a synthetic foam material. In the case of very high flexibility, the adornment may take on all sorts of shapes, providing a flexibility which is incompatible with prior solutions to the inventive problem.

Whatever the particular embodiment chosen, the key can be given an appearance which contrasts with that of the pieces, in color or in material of manufacture. Thus, in the embodiment of FIGS. 8-9, the plates 44 may be given an appearance different from that of the pieces 41 and 42.

It should be noted that the embodiment of FIGS. 4-7 envisions a key in the form of a spherical body, which can play the role of a hinge means, where, after the assembly is completed, the key is attached to one of the pieces, so that they can pivot with respect to the other piece. The piece attached to the key may be the pivotable piece (e.g. a furniture door), while the other piece remains stationary (e.g. the frame of an item of furniture).

With the embodiment of FIGS. 1 to 3, the tubular key may be provided in transparent or translucent form and may contain a source of light, such as an electric light bulb or tube. The pieces then constitute a lamp body. One may provide zones of the key which create different lighting effects, and then by rotating the key the zone or zones producing the desired effect (e.g., intense lighting, filtered lighting, colored lighting, etc.) may be exposed.

The use of the invention is not confined to the manufacture of furniture (in particular, finished furniture items). The invention may also be used for toys which can be disassembled; for construction assemblies; etc.

We claim:

1. An article which comprises two pieces having rectilinear slots which engage one another by mutual insertion to achieve an angular assembly of the said pieces; characterized in that the said pieces are in the form of rigid nondeformable panels which are relatively thin with respect to the length and width of their two major faces, which panels have openings passing through them from one major face to the other, wherewith the said slots open out into said openings from one side of the latter, portions of the slots being disposed beyond the openings which they have passed over across a solid part of the other piece which solid part is disposed opposite to the slot on the said other piece, across the respective opening from said slot on the said other piece, the two panels being aligned and the article further including a locking key having the same height as the openings, which key is fitted in said openings and supported on two opposing sides of said openings which sides do not have slots in them, and which key is rigid and non-deformable in its height dimension lengthwise of the slots so as to prevent the slots from being moved back through the said openings, which movement would result in the disengagement of the slots and the separation of the pieces.

2. An article according to claim 1; characterized in that each panel is attached to a plate disposed in the respective opening, which plate constitutes said locking key, has substantially the same height as the opening and is pivotably mounted on a pivot with an axis parallel to that of the respective slot, which pivot is disposed outside of said opening, and the said plate itself has a slot which is aligned with the slot of the panel and which extends to the center of the said plate which is also the center of the said opening.

3. An article according to claim 1 characterized in that the locking key has a contour which is wider than the contour of the openings as aligned, and said key is comprised of an elastically deformable material.

4. An article according to claim 1 characterized in that the locking key is comprised of a central, rigid core which is surrounded by an elastically deformable material.

5. An article according to claim 1 characterized in that the configuration of the locking key is such that the key is rigid in its height dimension and is elastically deformable in directions perpendicular to the height dimension.

6. An article according to claim 5 characterized in that the locking key is a tubular element with a longitudinal axis comprised of a semi-flexible material, and is placed in the openings with its axis parallel to that of the slots.

7. An article according to claim 6 characterized in that the tubular element has grooves intended to cooperate with the side faces of the slots.

8. An article according to claim 1 characterized in that each opening in the panels is circular, and the locking key is in the form of a spherical element which is substantially rigid and which has two rectilinear grooves which are parallel and are symmetric with respect to a diameter of the spherical element, wherewith the bottoms of the grooves are separated by a distance which is generally equal to the diameter of the openings.

9. An assembly of rigid non-deformable panel members mutually angled one to another comprising first and second panel members each formed with an elongate slot extending from one edge of the panel member and an enlarged opening into which the slot extends, the slots and openings in the respective panel members having like dimensions whereby the panel members are connectable together at an angle by sliding the slot of one of the panel members lengthwise through the slot and opening of the other panel member and into embracing engagement with the material of the other panel member beyond the opening therein until the openings of the respective panel members are mutually aligned in the lengthwise direction of the slots, the assembly further including a locking key device for fitting in the openings when the openings are aligned as aforesaid, the locking key device having substantial non-deformable rigidity in the lengthwise direction of the slots to prevent separation of the panels when the locking key device is fitted in the openings.

10. An assembly as claimed in claim 9 wherein the openings are rectangular and the locking key device is cylindrical being elastically deformable in a direction transversely of the length of the slots.

11. An assembly as claimed in claim 10 wherein the locking key device has lengthwise grooves for receiving edge portions of the respective panels defining the respective openings.

12. An assembly as defined in claim 9 wherein the openings are circular and the locking key device is spherical with opposed grooves for receiving opposite edge portions of one of the panels defining the opening therein.

13. An assembly as defined in claim 9 wherein each panel includes a pivotal slotted plate mounted in the opening, the plates of the respective panels being configured for slotting one into the other when the panels are assembled, and for rotation as a unit to form the locking key device.

* * * * *